United States Patent
Park et al.

(10) Patent No.: US 9,979,528 B2
(45) Date of Patent: May 22, 2018

(54) DATA COMMUNICATION METHOD IN OVERLAPPING BASIC SERVICE SET (OBSS) ENVIRONMENT

(71) Applicant: ELECTRONICS AND TELECOMMUNICATIONS RESEARCH INSTITUTE, Daejeon (KR)

(72) Inventors: Jae Woo Park, Daejeon (KR); Il Gyu Kim, Chungcheongbuk (KR); Yu Ro Lee, Daejeon (KR); Jae Seung Lee, Daejeon (KR); Jee Yon Choi, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 92 days.

(21) Appl. No.: 14/947,194

(22) Filed: Nov. 20, 2015

(65) Prior Publication Data

US 2016/0150550 A1    May 26, 2016

(30) Foreign Application Priority Data

Nov. 20, 2014  (KR) .................. 10-2014-0162637
Nov. 19, 2015  (KR) .................. 10-2015-0162537

(51) Int. Cl.
*H04L 5/00*      (2006.01)
*H04W 74/00*   (2009.01)
*H04W 74/08*   (2009.01)

(52) U.S. Cl.
CPC ......... *H04L 5/0055* (2013.01); *H04W 74/008* (2013.01); *H04W 74/0816* (2013.01)

(58) Field of Classification Search
CPC ............ H04L 5/0055; H04W 74/0816; H04W 74/008
See application file for complete search history.

(56) References Cited

U.S. PATENT DOCUMENTS

| | | | |
|---|---|---|---|
| 2007/0133592 A1* | 6/2007 | Zheng | H04W 74/04 370/458 |
| 2007/0297371 A1* | 12/2007 | Lea | H04L 45/20 370/334 |
| 2012/0113975 A1 | 5/2012 | Kim et al. | |
| 2012/0257574 A1 | 10/2012 | Seok et al. | |
| 2013/0058218 A1 | 3/2013 | Wu et al. | |
| 2014/0010101 A1 | 1/2014 | Jin et al. | |
| 2014/0293355 A1* | 10/2014 | Rumph | H04N 1/58 358/3.23 |

* cited by examiner

Primary Examiner — Jianye Wu

(57) ABSTRACT

Provided is a data communication method performed at a transmission node, the method including collecting a node list including nodes communicable with the transmission node, exchanging the node list with each of the communicable nodes, determining an allowance of a space recycling transmission to a reception node by determining that the transmission node is a corresponding node as an exposed node in response to an occurrence of a clear-to-send (CTS) timeout, and transmitting data to the reception node based on a result of determining the allowance of the space recycling transmission.

15 Claims, 8 Drawing Sheets

FIG. 8

DATA COMMUNICATION METHOD IN OVERLAPPING BASIC SERVICE SET (OBSS) ENVIRONMENT

TECHNICAL FIELD

Embodiments relate to a method of transmitting data by space recycling in response to an occurrence of interference in an overlapping basic service set (OBSS) environment.

RELATED ART

In general, a local area network (LAN) that is a near field communication network is divided into a wired LAN and a wireless LAN (WLAN). The WLAN employs a method of performing communication on a network using propagation instead of using a cable. The WLAN has been introduced as an alternative for overcoming difficulties found in installation, maintenance and repair, and movement by cabling. According to an increase in mobile users, a need for the WLAN is also increasing.

In the recent times, an Institute of Electrical and Electronics Engineers (IEEE) 802.11 standard may be a mostly widely used WLAN standard. The regulations on a medium access control (MAC) and a physical layer (PEW) constituting the WLAN are defined in the IEEE 802.11 standard.

MAC layer defines orders and rules when a terminal or a device using a shared medium is willing to access shared medium.

In a state in which WLAN communication devices belonging to the same basic service set (BSS) are in communication based on a rule, propagation irradiation devices not belonging to the same BSS may irradiate propagation regardless of the rule in a near distance in which the propagation irradiation devices may exert an influence sufficiently. In this case, the WLAN communications may experience malfunctioning communication.

With the spread of smart phones and the like, the use of a WLAN is exploding and a frequency band used for the WLAN is saturated. Further, due to a characteristic of WLAN technology using a centralized method and not in coordination with other access points, the performance of the WLAN has been significantly degraded by interference in an overlapping BSS (OBSS) environment.

In a case in which message symbol transmissions of access point networks simultaneously occur in a multi-access point network environment of an interference environment, the entire network throughput may be degraded due to an interference phenomenon. Accordingly, an appropriate interference coordination is required to prevent the degradation in the throughput by the interference phenomenon.

In the WLAN, an exposed node in which interference occurs may be present when two neighboring transmission nodes attempt to perform transmission to different reception nodes. The WLAN may inform an exposed node environment using request to send (RTS)/clear to send (CTS) frames.

In an interference environment, a transmission node may perform synchronization with another transmission node using an RTS frame received from the other transmission node. In the related art, information is extracted from the RTS frame for synchronization. However, in many cases, in addition to data and ACK, a network allocation vector (NAV) up to a maximum value allowed in the WLAN is set in an RTS frame of the transmission node and thereby the RTS frame of the transmission node may be transmitted.

Additionally, the transmission node is unaware of an accurate duration, for example, an actual time, for example, ACK physical layer convergence procedure (PLCP) protocol data unit (PPDU), of ACK or block ACK, which varies based on a modulation coding set (MCS) and transmitted from a reception node. Accordingly, it is difficult for the transmission node to perform transmission through accurate synchronization.

DETAILED DESCRIPTION

Object

Embodiments provide a method that may determine whether a transmission node in an exposed node environment may transmit data.

Embodiments also provide a method that enables a transmission node in an exposed node environment to perform synchronization with another transmission node for data transmission.

Solution

According to an aspect, there is provided a data communication method performed at a transmission node, the method including collecting a node list including nodes communicable with the transmission node, exchanging the node list with each of the communicable nodes, determining an allowance of a space recycling transmission to a reception node by determining that the transmission node is an exposed node in response to an occurrence of a clear-to-send (CTS) timeout, and transmitting data to the reception node based on a result of determining the allowance of the space recycling transmission.

The node list may include an address of a communicable node and a signal strength between nodes.

The exchanging may include transmitting an updated node list to each communicable node every time the node list is updated.

The collecting may include deleting the node list by aging.

The determining may include receiving a request-to-send (RTS) frame of another transmission node different from the transmission node and storing an address of the other transmission node, and verifying whether the address of the other transmission node is included in a node list of a reception node corresponding to a reception address of a frame to be transmitted from the transmission node.

The transmitting of the data may include resetting a network allocation vector (NAV) in response to the address of the other transmission node being absent in the node list of the reception node, and transmitting the data to the reception node.

The transmitting of the data may include extracting a preamble header from a data frame transmitted from the other transmission node, determining a limit based on a duration of data transmitted from the other transmission node in a legacy part of the preamble header, and transmitting the data frame to the reception node based on CTS-to-Self in response to a backoff count becoming zero.

The determining of the limit may include discarding the space recycling transmission in response to a data transmission that continues before the limit due to a relatively long length of a data physical layer convergence procedure (PLCP) protocol data unit (PPDU) of the transmission node.

The transmitting of the data may include transmitting the data to the reception node by the limit through padding and receiving an acknowledgement (ACK) from the reception node.

The determining of the allowance may include determining an availability of the space recycling transmission using an adjustment of a clear channel assessment (CCA) level, in response to the address of the other transmission node being included in the node list of the reception node.

The determining of the availability may include comparing signal strengths based on a node list collected at each of the transmission node and the reception node, and allowing the space recycling transmission in response to a signal strength of a transmission signal of the transmission node received at the reception node being greater by a preset magnitude than a signal strength of a transmission signal of the other transmission node received at the transmission node and a signal strength of the transmission signal of the other transmission node received at the reception node.

The transmitting of the data may include setting a limit by utilizing a preamble header included in a data frame transmitted from the other transmission node, and setting a data transmission and an ACK reception to be completed within the limit.

The transmitting of the data may include setting a modulation and coding set (MCS) of the data so that the data is receivable based on a difference between received signal strengths by estimating a signal-to-noise ratio (SNR).

According to another aspect, there is provided a transmission node to transmit data to a reception node, the transmission node including a node list processor configured to collect a node list including nodes communicable with the transmission node, and to exchange the node list with each of the communicable nodes and to store the exchanged node list, a determiner configured to determine an allowance of a space recycling transmission to a reception node by determining that the transmission node is an exposed node in response to an occurrence of a CTS timeout, and a communicator configured to transmit data to the reception node based on a result of determining the allowance of the space recycling transmission.

The determiner may be further configured to receive an RTS frame of another transmission node different from the transmission node and to store an address of the other transmission node, and to verify whether the address of the other transmission node is included in a node list of a reception node corresponding to a reception address of a frame to be transmitted from the transmission node.

The communicator may be further configured to reset a NAV in response to the address of the other transmission node being absent in the node list of the reception node, and to transmit data to the reception node.

The communicator may be further configured to extract a preamble header from a data frame transmitted from the other transmission node, to determine a limit based on a duration of data transmitted from the other transmission node in a legacy part of the preamble header, and to transmit the data frame to the reception node based on CTS-to-Self in response to a backoff count becoming zero.

The determiner may be further configured to determine an availability of the space recycling transmission using an adjustment of a CCA level, in response to the address of the other transmission node being included in the node list of the reception node.

The determiner may be further configured to allow the space recycling transmission in response to a signal strength of a signal of a second transmission node received at a second reception node being greater than a signal strength of a signal of a first transmission node received at the second transmission node and a signal strength of the signal of the first transmission node received at the second reception node.

The communicator may be further configured to set a limit by utilizing a preamble header included in a data frame transmitted from the other transmission node, and to set a data transmission and an ACK reception to be completed within the limit.

According to still another aspect, there is provided a reception node to receive data from a transmission node, the reception node including a node list processor configured to collect a node list including nodes communicable with the reception node, and to exchange the node list with each of the communicable nodes and to store the exchanged node list, and a communicator configured to receive the data from the transmission node determined as an exposed node through a space recycling transmission, and to transmit an ACK corresponding to a limit determined at the transmission node, in response to completion of a data reception.

The communicator may be further configured to set an MCS of the ACK to be receivable based on a difference between received signal strengths.

Effect

According to embodiments, it is possible to simultaneously transmit and receive data in some sections by recycling a data frame space, and to enhance the efficiency of WLAN transmission.

BRIEF DESCRIPTION OF THE DRAWINGS

These and/or other aspects, features, and advantages of the present disclosure will become apparent and more readily appreciated from the following description of embodiments, taken in conjunction with the accompanying drawings of which.

DETAILED DESCRIPTION

Hereinafter, embodiments are described below to explain the present disclosure by referring to the figures. The description to be provided in the following with the accompanying drawings is not to describe only an embodiment that may carry out the present disclosure and may include details to provide the full understanding of the present disclosure. However, it will be understood by one skilled in the art that the present disclosure may be implemented without the details.

The embodiments combine constituent elements and features of the present disclosure in a predetermined form. Each constituent element or feature may be considered being selective unless particularly explicitly described. Additionally, each constituent element or feature may be implemented without being combined with another constituent element or feature. Also, embodiments may be configured by combining some constituent elements and/or features. Order of operations described in the embodiments may be changed. A portion of configurations or features of a certain embodiment may be included in another embodiment and may also be replaced with a corresponding configuration or feature of another embodiment.

Terms used in the following are provided to help the understanding of the present disclosure and accordingly, the use of such a specific term may be modified in another form without departing from the technical spirit of the present disclosure.

In some cases, known structures and apparatuses are omitted or illustrated in a form of a block diagram based on key functions of each structure and apparatus in order to prevent the concept of the present disclosure from being ambiguous. Also, like reference numeral refer to like constituent elements throughout.

Embodiments may be supported by standard documents disclosed in at least one of an Institute of Electrical and Electronics Engineers (IEEE) 802 system, a $3^{rd}$ Generation Partnership Project (3GPP) system, a 3GPP Long Term Evolution (LTE) system, an LTE-advanced (LTE-A) system, and a 3GPP2 system. That is, operations or portions not described to clearly disclose the technical sprit of the present disclosure may be supported by the documents. Further, all of the terms disclosed herein may be explained by the standard document.

The following technology may be employed for various wireless systems, for example, a code division multiple access (CDMA), a frequency division multiple access (FDMA), a time division multiple access (TDMA), an orthogonal frequency division multiple access (OFDMA), a single carrier frequency division multiple access (SC-FDMA), and the like. The CDMA may be configured using radio technology, for example, universal terrestrial radio access (UTRA) and CDMA2000. The TDMA may be configured using radio technology, for example, global System for Mobile communications (GSM)/General Packet Radio Service (GPRS)/Enhanced Data Rates for GSM Evolution (EDGE). The OFDMA may be configured using radio technology, for example, IEEE 802.11 (Wi-Fi), IEEE 802.16 (WiMAX), IEEE 802-20, and Evolved UTRA (E-UTRA). For clarity of the description, the description will be made based on the IEEE 802.11 system. However, it is only an example and thus, the technical sprit of the present disclosure is not limited thereto.

Hereinafter, embodiments will be described with reference to the accompanying drawings.

Figure 1:
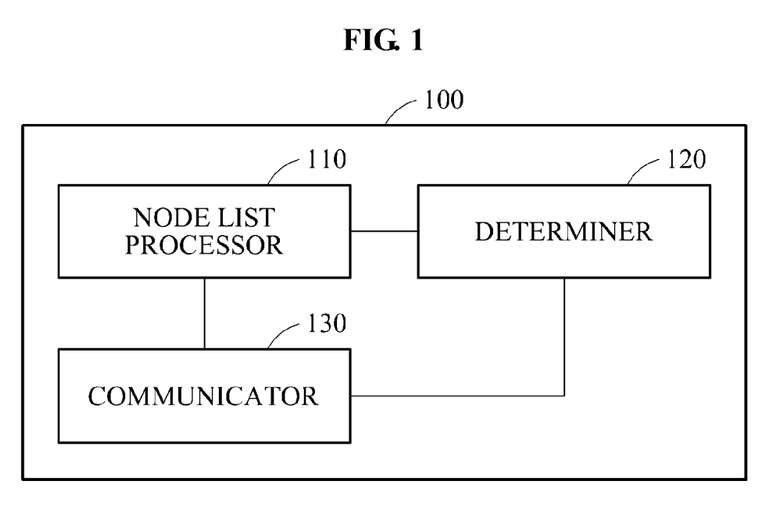
FIG. 1 is a block diagram illustrating a node apparatus according to an embodiment.

FIG. 1 is a block diagram illustrating a node apparatus according to an embodiment.

Referring to FIG. 1, a node device 100 may include a node list processor 110, a determiner 120, and a communicator 130. The node device 100 may include at least one of a reception node and a transmission node. A node may include a station (STA) and an access point (AP).

Each node device 100 within a wireless local area network (LAN) basic service set (BSS) may transmit, to another node device, a node list including nodes capable of performing reception. Here, the node device 100 may collect addresses of all of nodes capable of performing reception not in the same BSS, however, around the BSS and may also collect strengths of received signals.

The node list processor 110 may collect a node list including nodes communicable with the node device 100. For example, when the node device 100 is a transmission node, the node device 100 may collect a list of other node devices within coverage communicable with the transmission node. Here, the node list may include addresses of communicable node devices and a signal strength between node devices. The signal strength may refer to a strength of a transmission signal of a communicable node device received at the node device 100.

For example, an address of a node to which a transmission node may transmit data and a signal strength between the transmission node and a reception node may be generated as a node list.

Every time a node list including communicable nodes is updated, the node list processor 110 may transmit the updated node list. Also, the node list processor 110 may delete the node list by aging. That is, once the node list is updated, the node list processor 110 may store a new node list by exchanging the node list between node devices. Further, when the stored node list is not utilized to retrieve a communicable node device for a relatively long period of time, the node list processor 110 may delete the node list.

In response to an occurrence of clear-to-send (CTS) timeout, the determiner 120 may determine whether a space recycling transmission to a reception node is allowable by determining that a corresponding node is an exposed node. In detail, when the CTS timeout occurs at a transmission node that has received a request-to-send (RTS) frame, the determiner 120 may determine that the corresponding node is an exposed node. In this example, the transmission node may determine whether a space recycling transmission to a reception node is allowable.

The determiner 120 may receive an RTS frame of another transmission node different from the transmission node and store an address of the other transmission node, and may verify whether the address of the other transmission node is included in a node list of a reception node corresponding to a reception address of a frame to be transmitted from the transmission node. Here, the determiner 120 may determine whether a corresponding node is an exposed node based on the node list of the reception node.

When the address of the other transmission node is not included in the node list of the reception node, the determiner 120 may determine that interference is not to occur between transmission nodes. Accordingly, the determiner 120 may determine that the space recycling transmission is allowable. On the contrary, when the address of the other transmission node is included in the node list of the reception node, the determiner 120 may determine whether the space recycling transmission is allowable based on a received signal strength.

In response to the address of the other transmission node being included in the node list of the reception node, the determiner 120 may determine whether the space recycling transmission using an adjustment of a clear channel assessment (CCA) level is available. Here, a CCA may refer to one of functions of WLAN 8052.11 PHY and may perform a detection function regarding whether a shared wired channel is physically available.

The determiner 120 may compare signal strengths based on a node list collected at each of the transmission node and the reception node.

For example, when a signal strength of a transmission signal of the transmission node received at the reception node is greater by a preset magnitude than a signal strength of a transmission signal of the other transmission node received at the transmission node and a signal strength of the transmission signal of the other transmission node received at the reception node, the determiner 120 may allow the space recycling transmission.

The communicator 130 may transmit data to the reception node based on whether the space recycling transmission is allowable.

When the address of the other transmission node is not included in the node list of the reception node, the communicator 130 may reset a network allocation vector (NAV) and may transmit data to the reception node.

The communicator 130 may extract a preamble header from a data frame transmitted from the other transmission node.

In this instance, the communicator 130 may determine a limit based on a duration of data transmitted from the other transmission node in a legacy part of the preamble header When a data transmission does not end, that is, continues before the limit due to a relatively long length of a data PPDU of the transmission node, the communicator 130 may discard the space recycling transmission.

When a backoff count becomes zero, the communicator 130 may transmit the data frame to the reception node based on CTS-to-Self.

The communicator 130 may transmit data to the reception node by the limit through padding and may receive an acknowledgement (ACK) from the reception node.

The communicator 130 may set the limit by utilizing a preamble header included in a data frame transmitted from the other transmission node. Here, the communicator 130 may set a data transmission and an ACK reception to be completed within the limit.

The communicator 130 may set a modulation and coding set (MCS) of the data so that the data is receivable based on a difference between received signal strengths by estimating a signal-to-noise ratio (SNR).

The node device 100 may serve as the reception node.

In this example, the node device 100 that serves as the reception node to receive data from the transmission node may include the node list processor 110 configured to collect a node list including nodes communicable with the reception node, and to exchange the node list with each of the communicable nodes and to store the exchanged node list, and the communicator 130 configured to receive the data from the transmission node determined as an exposed node through a space recycling transmission, and to transmit an ACK corresponding to a limit determined at the transmission node, in response to completion of a data reception.

The communicator 130 may set an MCS of the ACK to be receivable based on a difference between received signal strengths.

Figure 2:
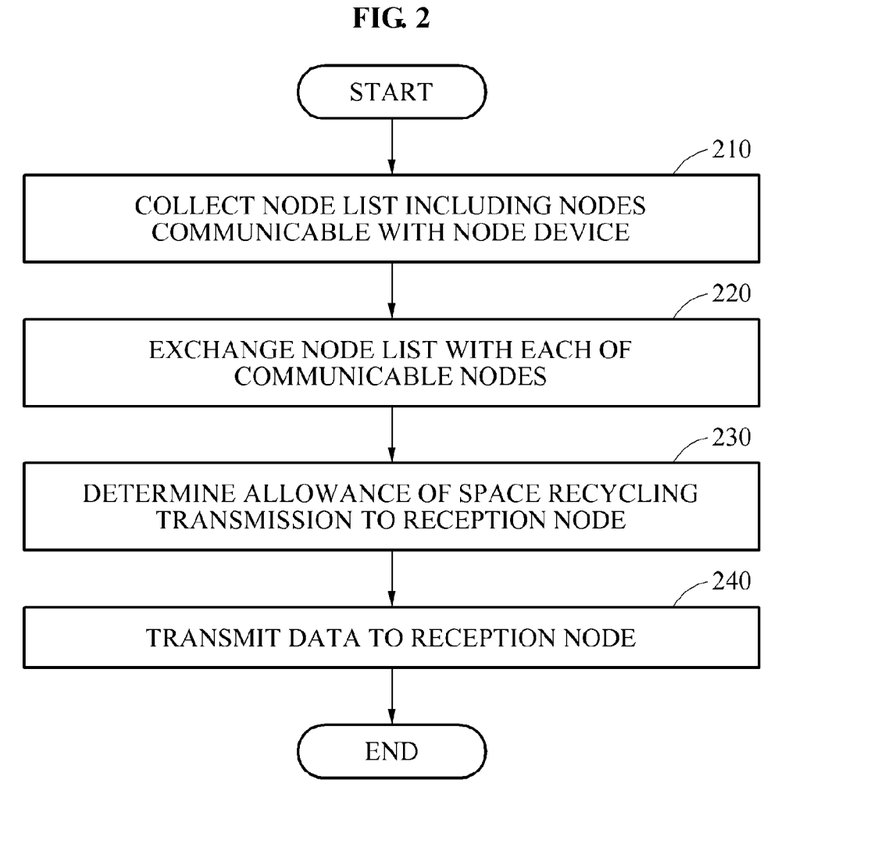
FIG. 2 is a flowchart illustrating a data communication method performed at a transmission node according to an embodiment.

FIG. 2 is a flowchart illustrating a data communication method performed at a node device according to an embodiment. Here, the node device may be a transmission node.

Referring to FIG. 2, in operation 210, the node device may collect a node list including nodes communicable with the node device. Here, the node list may include addresses of the communicable nodes and a signal strength between nodes.

The node device may delete the node list by aging.

In operation 220, the node device may exchange the node list with each of the communicable nodes.

Every time the node list including communicable nodes is updated, the node device may transmit the updated node list.

In operation 230, the node device may determine an allowance of a space recycling transmission to a reception node. The node device may receive an RTS frame of another transmission node different from the transmission node and may store an address of the other transmission node. The node device may verify whether the address of the other transmission node is included in a node list of a reception node corresponding to a reception address of a frame to be transmitted from the transmission node.

When the address of the other transmission node is not included in the node list of the reception node, interference does not occur in the reception node. Accordingly, the transmission node may perform data transmission.

On the contrary, when the address of the other transmission node is included in the node list of the reception node, interference occurs in the reception node. Accordingly, the node device that serves as the transmission node may compare received signal strengths.

In response to the address of the other transmission node being included in the node list of the reception node, the node device may determine whether the space recycling transmission using an adjustment of a CCA level is available. Here, the node device may compare signal strengths based on a node list collected at each of the transmission node and the reception node.

When a signal strength of a transmission signal of the transmission node received at the reception node is greater by a preset magnitude than a signal strength of a transmission signal of the other transmission node received at the transmission node and a signal strength of the transmission signal of the other transmission node received at the reception node, the node device may allow the space recycling transmission.

In operation 240, the node device may transmit data to the reception node using a space recycling transmission method.

When the address of the other transmission node is not included in the node list of the reception node, the node device may reset a NAV and may transmit data to the reception node.

The node device may extract a preamble header from a data frame transmitted from the other transmission node.

The node device may determine a limit based on a duration of data transmitted from the other transmission node in a legacy part of the preamble header When a data transmission does not end, that is, continues before the limit due to a relatively long length of a data PPDU of the transmission node, the node device may discard the space recycling transmission.

When a backoff count becomes zero, the node device may transmit the data frame to the reception node based on CTS-to-Self.

The node device may transmit data to the reception node by the limit through padding and may receive an ACK from the reception node.

The node device may set the limit by utilizing a preamble header included in a data frame transmitted from the other transmission node. Here, the node device may set a data transmission and an ACK reception to be completed within the limit.

The node device may set an MCS of the data so that the data is receivable based on a difference between received signal strengths by estimating an SNR.

Hereinafter, a wireless data communication method between a plurality of node devices in an overlapping basic service set (OBSS) environment according to an embodiment will be described with reference to FIGS. 3 through 8.

Figure 3:
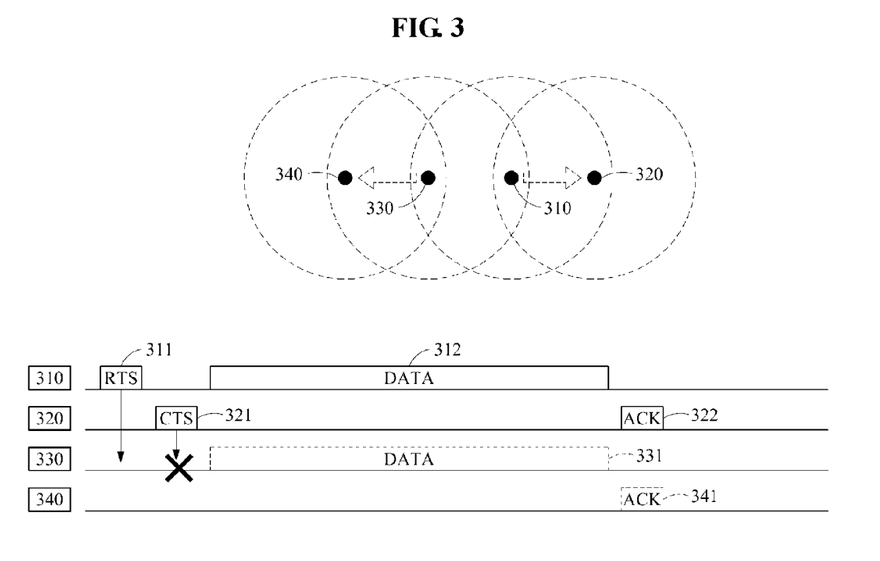
FIG. 3 illustrates an example of an exposed node environment according to an embodiment.

FIG. 3 illustrates an example of an exposed node environment according to an embodiment.

In an example in which a single transmission node is to transmit data to a reception node and in this instance, another transmission node present at a relatively close location is transmitting data, an NAV may be set and a data transmission may be limited.

Referring to FIG. 3, a wireless communication system according to an embodiment may include a first transmission node 310, a first reception node 320, a second transmission node 330, and a second reception node 340.

Here, due to a relatively close distance between the first transmission node 310 and the second transmission node 330, interference according to data transmission may occur. Referring to locations between node devices and coverage of the node devices, the first reception node 320 and the second reception node 340 are located at relatively far locations from each other and thus, do not affect each other. Accordingly, when the first transmission node 310 and the second transmission node 330 are to transmit data simultaneously, data may be received at the first reception node 320 and the second reception node 340 simultaneously. However, since the first transmission node 310 and the second transmission node 330 are included in mutual carrier sensing coverage, the data may not be transmitted simultaneously.

A protocol sequence of FIG. 3 shows an exposed node environment by RTS/CTS frames in a WLAN.

According to an embodiment, the first transmission node 310 may transmit an RTS frame 311 for transmission of data 312. The first reception node 320 may transmit a CTS 321 and may inform that the first reception node 320 is ready to receive the data 312. When the second transmission node 330 receives the RTS frame 311 transmitted from the first transmission node 310 and does not receive the CTS 321 transmitted from the first reception node 320, it is possible to induce that the first transmission node 310 and the second transmission node 330 are under an exposed node relationship. In this example, the second transmission node 330 may transmit data 331 to the second reception node 340 by synchronizing the data 312 of the first transmission node 310, an ACK 322 of the first reception node 320, and an ACK 341 of the second reception node 340.

Here, the second transmission node 330 may perform synchronization using the RTS frame 311 transmitted from the first transmission node 310, and may extract information from the RTS frame 311. Here, in many cases, the RTS frame 311 may be set with a NAV up to a maximum value allowed in the WLAN and thereby be transmitted instead of including only the data 312 and the ACK 322. Further, since the first transmission node 310 is unaware of an accurate duration (an actual time of an ACK PPDU) of an ACK or a block ACK transmitted from the first reception node 320, which varies based on an MCS, it may be difficult for the second transmission node 330 to perform transmission by accurately performing synchronization.

Figure 4:
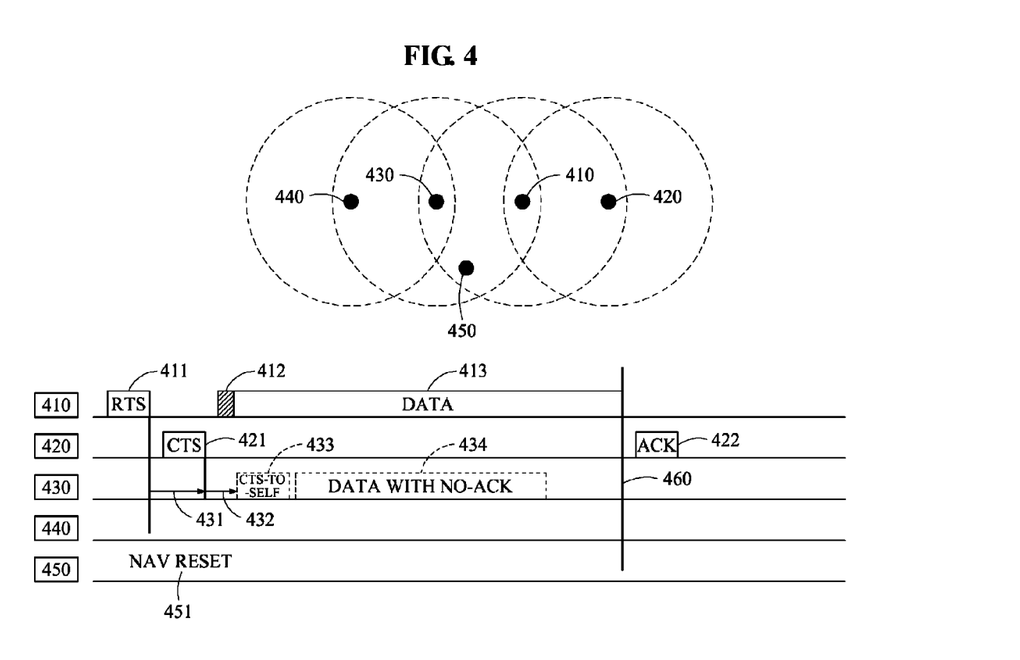
FIG. 4 illustrates an example of performing protection using clear-to-send (CTS)-to-Self and transmitting data with no-acknowledgment (ACK) in an exposed node environment according to an embodiment.

FIG. 4 illustrates an example of performing protection using CTS-to-Self and transmitting data with no-ACK in an exposed node environment according to an embodiment.

Referring to FIG. 4, a wireless communication system according to an embodiment may include a first transmission node 410, a first reception node 420, a second transmission node 430, a second reception node 440, and a third transmission node 450.

In the exposed node environment, the first transmission node 410 may transmit an RTS frame 411 to prevent a hidden node issue and the first reception node 420 may transmit a CTS 421. The second transmission node 430 is outside the coverage of the first reception node 420 and thus, may not receive the CTS 421. When a CTS timeout 431 is elapsed, the second transmission node 430 may perform a NAV resetting process. Since a virtual carrier sensing by NAV is set to be in an idle state, the second transmission node 430 may perform a carrier sense multiple access with collision avoidance (CSMA/CA) channel access procedure. When a backoff count 432 becomes zero, the second transmission node 430 may set a NAV for an area corresponding to the coverage of the second transmission node 430 using CTS-to-Self 433, thereby protecting a transmission. Although the third transmission node 450 present in the coverage of the first transmission node 410 is also under the exposed node relationship, the third transmission node 450 enters in an idle state instead of performing transmission due to a NAV reset 451 by the first transmission node 410. Here, a value of the NAV reset 451 in the CTS 421 may be set to match an end value of a NAV transmitted from the first transmission node 410.

The virtual carrier sensing, as a kind of a timer, refers to a function that enables a node having secured a transmission channel to inform a channel occupancy time in a transmission frame. Accordingly, whether a medium is in use may be logically known using a NAV timer.

Referring to a protocol sequence of FIG. 4, the first transmission node 410 may transmit the RTS frame 411 for transmission of data 413 and may transmit the data 413 in response to the CTS 421 received from the first reception node 420. Here, the second transmission node 430 may verify a limit 460 based on length information included in preamble information 412 of the data 413.

The second transmission node 430 may receive only preamble information present in a data PPDU transmitted from the first transmission node 410, and may discover a duration of the data PPDU from legacy information included in a preamble. Here, the duration may be used to acquire the limit 460 in which the second transmission node 430 may perform transmission.

In this example, when the data is data with no-ACK 434, the second transmission node 430 may transmit the data with no-ACK 434 to the second reception node 440 by the limit 460 and may be in a standby state until transmission of an ACK 422 from the first reception node 410 is completed. When the transmission of the data with no-ACK 434 does not end before the limit 460 due to a relatively long length of the data PPDU, the second transmission node 430 may discard a transmission sequence by space recycling.

Figure 5:
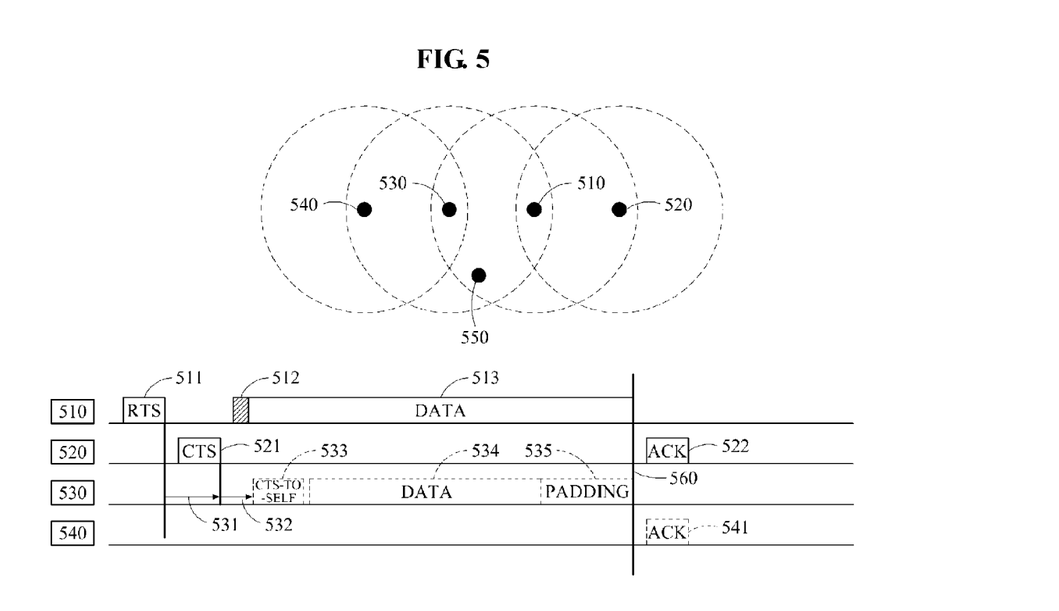
FIG. 5 illustrates an example of transmitting data and an ACK in an exposed node environment according to an embodiment.

FIG. 5 illustrates an example of transmitting data and ACK in an exposed node environment according to an embodiment.

Referring to FIG. 5, a wireless communication system according to an embodiment may include a first transmission node 510, a first reception node 520, a second transmission node 530, a second reception node 540, and a third transmission node 550.

A procedure of transmitting data 534 that requires an ACK by space recycling will be described with reference to FIG. 5. The first transmission node 510 may transmit an RTS frame 511 for transmission of data 513 and the first reception node 520 may transmit a CTS 521 when the first reception node 520 is ready to receive the data 513. The second transmission node 530 is outside the coverage of the first reception node 520 and thus, may not receive the CTS 521. When a CTS timeout 531 is elapsed, the second transmission node 530 may perform a NAV resetting process. Since a virtual carrier sensing by NAV is set to be in an idle state, the second transmission node 530 may perform a CSMA/CA channel access procedure. When a backoff count 532 becomes zero, the second transmission node 530 may set a NAV for an area corresponding to the coverage of the second transmission node 530 using CTS-to-Self 533, thereby protecting a transmission.

The second transmission node 530 may match a length by a limit 560 by transmitting the data 534 and padding 535 using A-MPDU Pre-Eof Padding (APEP) defined in an IEEE 802.11ac standard. Here, the second transmission node 530 may verify the limit 560 based on length information included in preamble information 512 of the data 513.

Referring to a protocol sequence of FIG. 5, the second reception node 540 may transmit an ACK 541 to the second transmission node 530 at the same time at which the first reception node 520 transmits an ACK 522 to the first transmission node 510. Here, when durations of the ACK 541 and the ACK 522 differ, transmission may be protected based on inter frame spacing (IFS). Accordingly, a collision issue and the like may not occur regardless of the first transmission node 510 initiating a new sequence.

Figure 6:
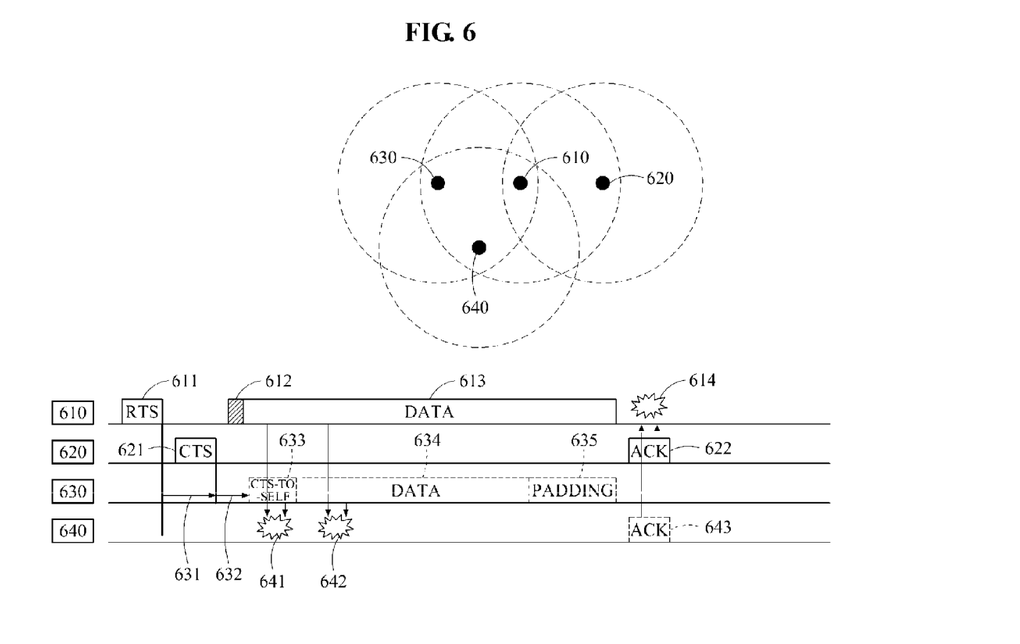
FIG. 6 illustrates an example of an error occurring in transmitting data and an ACK by space recycling according to an embodiment.

FIG. 6 illustrates an example of an error occurring in transmitting data and ACK by space recycling according to an embodiment.

Referring to FIG. 6, a wireless communication system according to an embodiment may include a first transmission node 610, a first reception node 620, a second transmission node 630, and a second reception node 640.

The first transmission node 610 may transmit an RTS frame 611 for transmission of data 613 and the first reception node 610 may transmit a CTS 621 when the first reception node 610 is ready to receive the data 613. The second transmission node 630 is outside the coverage of the first reception node 620 and thus, may not receive the CTS 621. In this example, when a CTS timeout 631 is elapsed, the second transmission node 630 may perform a NAV resetting process. When a backoff count 632 becomes zero, the second transmission node 630 may transmit CTS-to-S elf 633 and thereby transmit data 634 and padding 635. In this case, since the second reception node 640 becomes to be in the coverage of the first transmission node 610 and the second reception node 620, collisions 641 and 642 may occur due to the transmission of CTS-to-Self 633 and the data 634. Further, since the first transmission node 610 is in the coverage of the first reception node 620 and the second reception node 640, a collision 614 may occur between ACKs 622 and 643.

Referring to a protocol sequence of FIG. 6, when the second transmission node 630 determines that the space recycling transmission is allowable, the second transmission node 630 may transmit data on which the CTS-to-Self 633 and the padding 635 is performed. In this example, since the second reception node 640 is to simultaneously receive the data 613 transmitted from the first transmission node 610 and the data 634 transmitted from the second transmission node 630, an occurrence probability of the collision 642 may be significantly high. Regardless of the second reception node 640 having succeeded in receiving the data 634 transmitted from the second transmission node 630 without a collision, the second reception node 640 and the first transmission node 610 are included in the mutual coverage.

Accordingly, since the ACK 643 transmitted from the second reception node 640 and the ACK 622 transmitted from the first reception node 620 are to be simultaneously received at the first transmission node 610, the collision 614 may occur. Accordingly, retransmission may be performed at the first transmission node 610. In the example of FIG. 6, the space recycling transmission may not be applied.

Figure 7:
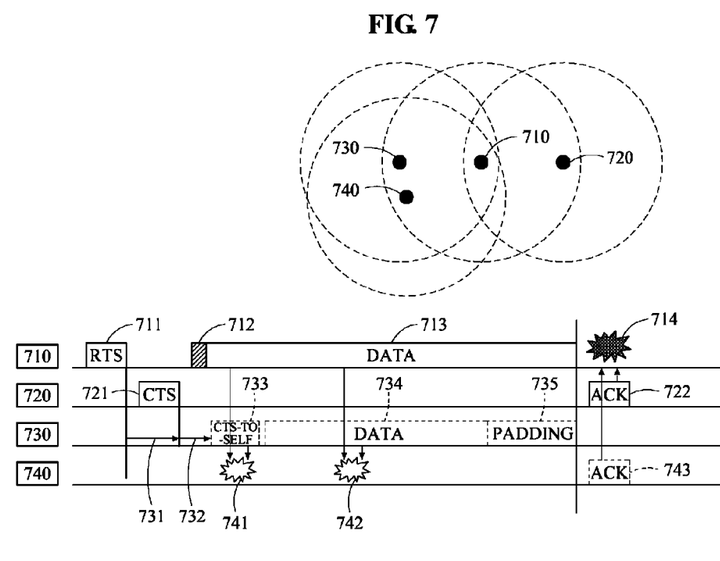
FIG. 7 illustrates an example of transmitting data and an ACK by space recycling based on a difference between received signal strengths according to an embodiment.

FIG. 7 illustrates an example of transmitting data and ACK by space recycling based on a difference between received signal strengths according to an embodiment.

Referring to FIG. 7, a wireless communication system according to an embodiment may include a first transmission node 710, a first reception node 720, a second transmission node 730, and a second reception node 740.

The first transmission node 710 may transmit an RTS frame 711 for transmission of data 713 and the first reception node 720 may transmit a CTS 721 when the first reception node 720 is ready to receive the data 713. The second transmission node 730 is outside the coverage of the first reception node 720 and thus, may not receive the CTS 721. In this example, when a CTS timeout 731 is elapsed, the second transmission node 730 may perform a NAV resetting process. When a backoff count 732 becomes zero, the second transmission node 730 may transmit CTS-to-Self 733 and thereby transmit data 734 and padding 735. In this case, when the second transmission node 730 transmits the CTS-to-Self 733 and the data, collisions 741 and 742 with the data 713 transmitted from the first transmission node 710 may occur. However, communication may be performed based on a difference between received signal strengths.

However, since a distance between the second transmission node 730 and the second reception node 740 is less than a distance between the second reception node 740 and the first transmission node 710, the second reception node 740 may receive the CTS-to-Self 733 and the data 734 transmitted from the second transmission node 730 based on a difference between received signal strengths. Here, when a length of the data 734 transmitted from the second transmission node 730 is set based on the rule of FIG. 5, an ACK 722 transmitted from the first reception node 720 and an ACK 743 transmitted from the second reception node 740 are to be simultaneously received at the first transmission node 710. Accordingly, a collision 714 may occur.

Figure 8:
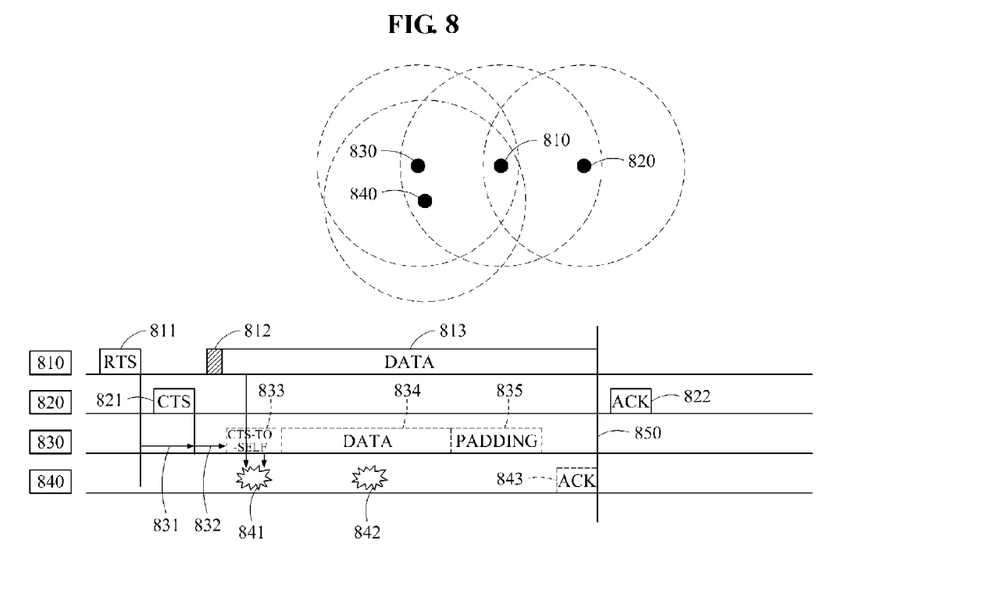
FIG. 8 illustrates an example of transmitting data and an ACK by space recycling based on a difference between received signal strengths according to an embodiment.

FIG. 8 illustrates an example of transmitting data and an ACK by space recycling based on a difference between received signal strengths according to an embodiment.

Referring to FIG. 8, a wireless communication system according to an embodiment may include a first transmission node 810, a first reception node 820, a second transmission node 830, and a second reception node 840.

The first transmission node 810 may transmit an RTS frame 811 for transmission of to data 813 and the first reception node 820 may transmit a CTS 821 when the first reception node 820 is ready to receive the data 813. The second transmission node 830 is outside the coverage of the first reception node 820 and thus, may not receive the CTS 821. In this example, when a CTS timeout 831 is elapsed, the second transmission node 830 may perform a NAV resetting process. When a backoff count 832 becomes zero, the second transmission node 830 may transmit CTS-to-S elf 833 and thereby transmit data 834 and padding 835. In this case, when the second transmission node 830 transmits the CTS-to-Self 833 and the data 834, collisions 841 and 842 with the data 813 transmitted from the first transmission node 810 may occur. However, communication may be performed based on a difference between received signal strengths.

Here, when the second reception node 840 is capable of performing data reception by space recycling, a length of a frame that is transmitted from the second transmission node 830 may be limited so that a sequence may be completed within a limit 850 by considering reception of the ACK 843. Accordingly, data transmission may be performed based on a time difference between an ACK 822 transmitted from the first reception node 820 and an ACK 843 transmitted from the second reception node 840.

The units described herein may be implemented using hardware components, software components, or a combination thereof. For example, a processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums.

The methods according to the embodiments may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tapes; optical media such as CD ROMs and DVDs; magneto-optical media such as floptical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments, or vice versa.

Although a few embodiments have been shown and described, those skilled in the art may make various alterations and modifications from the description. For example, appropriate results may be achieved by performing the aforementioned technologies in order different from the aforementioned methods, and/or by combining constituent elements such as systems, structures, devices, circuits, and the like, in forms different from the methods, or by substituting or replacing the constituent elements with other constituent elements or their equivalents. Accordingly, other implementations, other embodiments, and the equivalents of the claims are to belong to the scope of the claims.

What is claimed is:

1. A data communication method performed at a transmission node, the method comprising:
   collecting a node list that includes nodes communicable with the transmission node;
   exchanging the node list with each of the communicable nodes;
   determining whether a transmission to a reception node that is simultaneous to a transmission from a nearby interfering node is permitted by determining that the transmission node is an exposed node in response to an occurrence of a clear-to-send (CTS) timeout; and
   when the simultaneous transmission is permitted, transmitting data to the reception node, and
   wherein the CTS timeout occurs when the transmission node receives a request-to-send (RTS) frame from another transmission node, but does not receive a CTS frame from a reception node of the other transmission node.

2. The method of claim 1, wherein the node list comprises an address of a communicable node and a signal strength between nodes.

3. The method of claim 1, wherein the exchanging comprises transmitting an updated node list to each communicable node every time the node list is updated.

4. The method of claim 1, wherein the collecting comprises deleting the node list by aging.

5. The method of claim 1, wherein the determining comprises:
   receiving the request-to-send (RTS) frame of the other transmission node different from the transmission node and storing an address of the other transmission node; and
   verifying whether the address of the other transmission node is included in a node list of a reception node corresponding to a reception address of a frame to be transmitted from the transmission node.

6. The method of claim 5, wherein the transmitting of the data comprises resetting a network allocation vector (NAV) in response to the address of the other transmission node being absent in the node list of the reception node, and transmitting the data to the reception node.

7. The method of claim 5, wherein the transmitting of the data comprises:
   extracting a preamble header from a data frame transmitted from the other transmission node;
   determining a limit based on a duration of data transmitted from the other transmission node in a legacy part of the preamble header; and
   transmitting the data frame to the reception node based on CTS-to-Self in response to a backoff count becoming zero.

8. The method of claim 7, wherein the determining of the limit comprises discarding the simultaneous transmission in response to a data transmission that continues before the limit due to a relatively long length of a data physical layer convergence procedure (PLCP) protocol data unit (PPDU) of the transmission node.

9. The method of claim 7, wherein the transmitting of the data comprises transmitting the data to the reception node by the limit through padding and receiving an acknowledgement (ACK) from the reception node.

10. The method of claim 5, wherein the determining of the allowance comprises determining an availability of the simultaneous transmission using an adjustment of a clear channel assessment (CCA) level, in response to the address of the other transmission node being included in the node list of the reception node.

11. The method of claim 10, wherein the determining of the availability comprises:
 comparing signal strengths based on a node list collected at each of the transmission node and the reception node; and
 allowing the simultaneous transmission in response to a signal strength of a signal of a second transmission node received at a second reception node being greater than a signal strength of a signal of a first transmission node received at the second transmission node and a signal strength of the signal of the first transmission node received at the second reception node.

12. The method of claim 10, wherein the transmitting of the data comprises:
 setting a limit by utilizing a preamble header included in a data frame transmitted from the other transmission node; and
 setting a data transmission and an ACK reception to be completed within the limit.

13. The method of claim 10, wherein the transmitting of the data comprises:
 setting a modulation and coding set (MCS) of the data so that the data is receivable based on a difference between received signal strengths by estimating a signal-to-noise ratio (SNR).

14. A transmission node to transmit data to a reception node, the transmission node comprises:
 a node list processor configured to collect a node list including nodes communicable with the transmission node, and to exchange the node list with each of the communicable nodes and to store the exchanged node list;
 a determiner configured to determine whether a simultaneous transmission to a reception node is permitted by determining that the transmission node is an exposed node in response to an occurrence of a clear-to-send (CTS) timeout; and
 a communicator configured to transmit data to the reception node when the simultaneous transmission is permitted, and
 wherein the CTS timeout occurs when the transmission node receives a request-to-send (RTS) frame from another transmission node, but does not receive a CTS frame from a reception node of the other transmission node.

15. A reception node to receive data from a transmission node, the reception node comprising:
 a node list processor configured to collect a node list including nodes communicable with the reception node, and to exchange the node list with each of the communicable nodes and to store the exchanged node list; and
 a communicator configured to receive the data from the transmission node determined as an exposed node through a simultaneous transmission, and to transmit an acknowledgement (ACK) corresponding to a limit determined at the transmission node, in response to completion of a data reception.

\* \* \* \* \*